(12) United States Patent
Glew

(10) Patent No.: US 7,287,744 B2
(45) Date of Patent: Oct. 30, 2007

(54) FUEL CONDITIONING APPARATUS

(76) Inventor: Wayne Glew, 1004 Chapman Road, Glenfield (via Geraldton), Western Australia (AU) WA 6532

( * ) Notice: Subject to any disclaimer, the term of this patent is extended or adjusted under 35 U.S.C. 154(b) by 0 days.

(21) Appl. No.: 11/134,118

(22) Filed: May 20, 2005

(65) Prior Publication Data

US 2005/0257428 A1  Nov. 24, 2005

(30) Foreign Application Priority Data

May 24, 2004  (AU) ............................ 2004902733

(51) Int. Cl.
*F02M 7/12* (2006.01)
*F02M 29/04* (2006.01)

(52) U.S. Cl. .................... 261/62; 123/292; 251/84; 261/DIG. 55

(58) Field of Classification Search ............... 261/62, 261/76, DIG. 55; 251/84; 123/285, 288, 123/292
See application file for complete search history.

(56) References Cited

U.S. PATENT DOCUMENTS

| 719,536 | A | * | 2/1903 | Tuttle | 261/62 |
|---|---|---|---|---|---|
| 866,490 | A | * | 9/1907 | Lewis | 261/141 |
| 973,056 | A | * | 10/1910 | Mader | 261/62 |
| 999,686 | A | * | 8/1911 | Westaway | 261/50.1 |
| 1,626,085 | A | * | 4/1927 | Henriot | 261/40 |
| 2,009,233 | A | * | 7/1935 | Jennings | 261/64.1 |
| 2,016,449 | A | * | 10/1935 | Moysard | 261/65 |
| 3,544,290 | A | * | 12/1970 | Larson, Sr. et al. | 48/189.5 |
| 3,778,038 | A | * | 12/1973 | Eversole et al. | 261/50.1 |
| 3,939,231 | A | * | 2/1976 | Steele et al. | 261/62 |
| 4,022,173 | A | | 5/1977 | Read | 123/557 |
| 4,123,233 | A | | 10/1978 | Mannino | 48/180.1 |
| 4,231,383 | A | | 11/1980 | Eversole et al. | 137/1 |
| 4,426,966 | A | | 1/1984 | Hüther et al. | 123/286 |

(Continued)

FOREIGN PATENT DOCUMENTS

GB  2 305 215  4/1997

(Continued)

OTHER PUBLICATIONS

Steven Shaffer, Chief Engineer, Fuel Cells, "Development Update on Delphi's Solid Oxide Fuel Cell System", Delphi Battelle, Pacific Grove, CA, 2005 SECA Review Meeting, Apr. 20, 2005, pp. 2-41.

*Primary Examiner*—Richard L. Chiesa
(74) *Attorney, Agent, or Firm*—Burr & Brown

(57) ABSTRACT

A fuel conditioning system (10) comprises a housing (12) defining a chamber (14) and provided with an inlet (16) upstream of the chamber (14) and an outlet (18) downstream of the chamber (14). A hemispherical seat (20) is formed in the housing (10) with a first end (22) in communication with the inlet (16), and a second end (24) in communication with the chamber (14). A valve body (26) is received within the seat (20) and is moveable between a closed position and an open position where the valve body is spaced from the inlet (16) to allow air to flow into the chamber (14). A spring (32) biases a valve body at a pressure of approximately one atmosphere toward the closed position. Fuel is sprayed from a plurality of jets (72) formed in the seat and laterally relative to the flow of air past the valve body.

13 Claims, 2 Drawing Sheets

U.S. PATENT DOCUMENTS

| | | | |
|---|---|---|---|
| 4,711,222 A | 12/1987 | Rawlings | 123/555 |
| 4,725,041 A | 2/1988 | Chauvin et al. | 251/129.15 |
| 4,781,165 A | 11/1988 | Rawlings | 123/555 |
| 5,232,164 A * | 8/1993 | Resch et al. | 239/434 |
| 5,360,166 A | 11/1994 | Nogi et al. | 239/404 |
| 5,373,822 A | 12/1994 | Thompson | 123/520 |
| 5,711,282 A | 1/1998 | Lang et al. | 123/549 |
| 5,762,832 A * | 6/1998 | Glew | 261/36.2 |
| 5,924,402 A | 7/1999 | Regueiro | 123/254 |
| 6,205,983 B1 | 3/2001 | Egizi | 123/531 |
| 6,371,387 B1 | 4/2002 | Nally et al. | 239/408 |
| 6,935,283 B2 * | 8/2005 | Glew | 123/3 |
| 2003/0154933 A1 * | 8/2003 | Glew | 123/3 |
| 2003/0234455 A1 | 12/2003 | Mieney et al. | 261/76 |
| 2005/0230854 A1 * | 10/2005 | DeLisle | 261/79.1 |

FOREIGN PATENT DOCUMENTS

| | | | | |
|---|---|---|---|---|
| JP | 6-147015 | * | 5/1994 | 261/62 |
| WO | 03/056165 | | 7/2003 | |

* cited by examiner

FUEL CONDITIONING APPARATUS

FIELD OF THE INVENTION

The present invention relates to a fuel conditioning apparatus particularly, though not exclusively for an internal combustion engine.

BACKGROUND OF THE INVENTION

The present Inventor is the Inventor of a fuel supply system described in International Application No. WO2003/056165. This system comprises a housing defining a chamber and provided with an inlet opening upstream of the chamber and an outlet opening downstream of the chamber. A fuel injector sprays a fuel mist into the chamber, and a heater heats air flowing into the chamber via the inlet to a temperature of between 110° C. to 260° C. Pressure within the chamber is negative relative to ambient temperature. The fuel sprayed into the chamber by the fuel injector is thermally cracked so that a mixture of cracked fuel and heated air flows from the outlet to a combustion chamber in an associated internal combustion engine.

SUMMARY OF THE INVENTION

According to the present invention there is provided a fuel conditioning apparatus comprising:

a housing defining a chamber and provided with an inlet upstream of the chamber and an outlet downstream of the chamber;

a hemispherical seat with a first end in fluid communication with the inlet and a second end in fluid communication with the chamber, the second end lying in a plane containing a diameter of the hemispherical seat;

a valve body comprising a curved surface and a planar surface extending across the curved surface, the valve body being movable between a closed position where the valve body seals the inlet, and an open position where the valve body is spaced from the inlet to produce a gap between the valve and the seat allowing air at the inlet to flow through the first and second ends into the chamber;

a biasing device that biases the valve body toward the closed position; and, a fuel delivery system comprising fuel injector provided with a plurality of jets that open onto the hemispherical seat and are disposed about the valve body, the jets arranged to spray fuel across the gap and laterally relative to a direction of flow of the air from the inlet into the chamber.

Preferably the curved surface is hemispherical in shape having a radius substantially the same as a radius of said seat, whereby when said valve body is in said closed position said planar surface lies in the plane containing the diameter of the seat.

Preferably the chamber comprises an internal surface with a first portion extending in an inclined manner contiguously from the second end toward the outlet.

Preferably the first portion of the internal surface is concavely curved when viewed in a direction from the outlet to the inlet.

Preferably the air is fresh air.

Preferably the apparatus further comprises a shaft associated with the valve body to guide the valve body when moving between the closed position and opened position.

Preferably the shaft extends into a passage formed in the valve body perpendicular to the planar surface and along a radius of the valve body.

Preferably the bias device is mounted on the shaft.

Preferably the bias device applies a pressure in the order of one bar on the valve body.

Preferably the apparatus further comprises a plate lying parallel to the planar surface and located centrally of a longitudinal axis of the chamber between the second opening and the outlet, the plate dimensioned to provide an annular space between the plate and adjacent portion of the internal surface of the chamber.

Preferably the apparatus further comprises a first mesh screen extending across the chamber and located between the plate and the outlet.

Preferably the apparatus comprises a second mesh screen extending across the chamber and located between the first mesh and the outlet.

BRIEF DESCRIPTION OF THE DRAWINGS

An embodiment of the present invention will now be described only with reference to the accompanying drawings in which.

DETAILED DESCRIPTION OF THE EMBODIMENT

Figure 1:
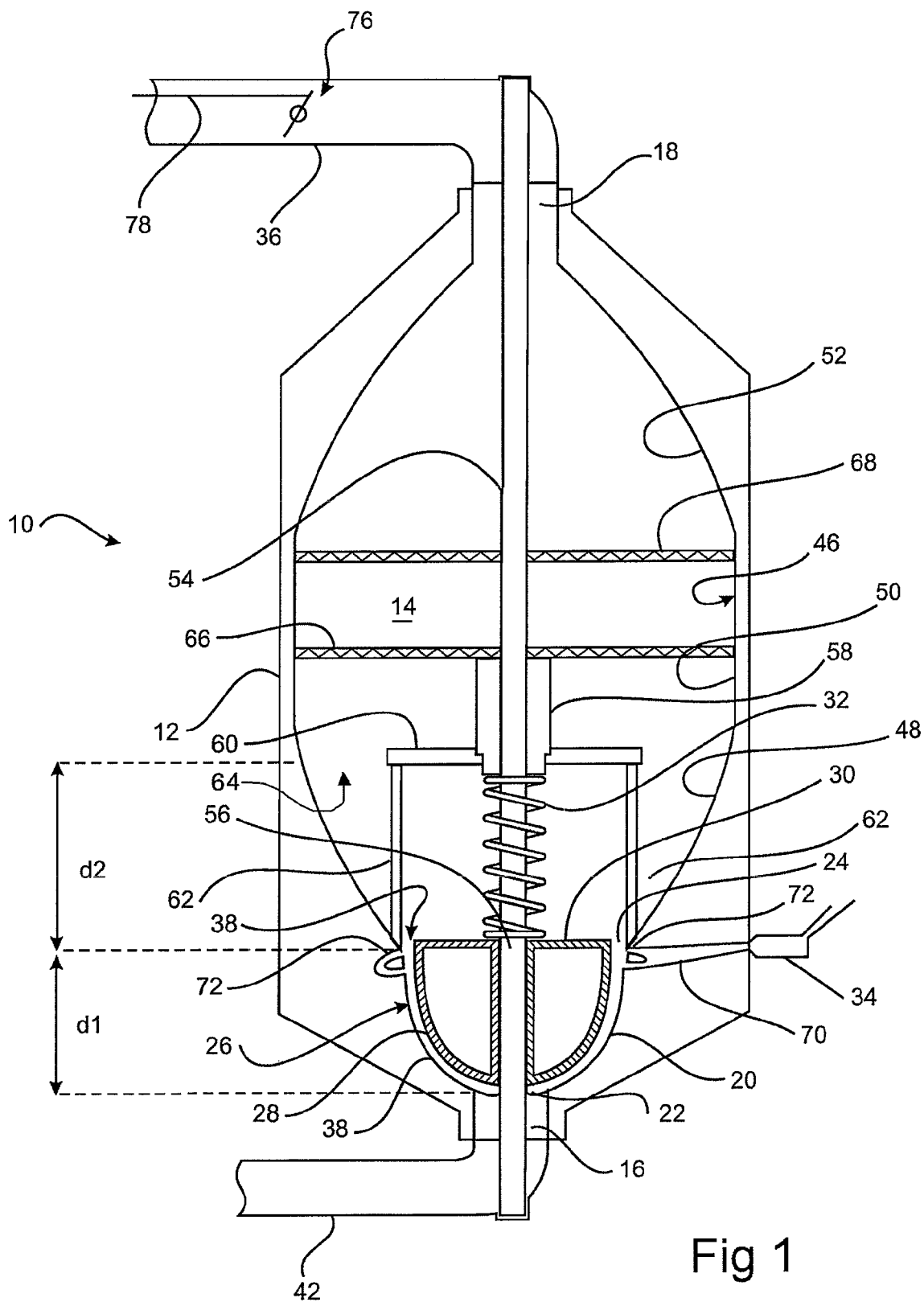
FIG. 1 is a schematic representation of a first embodiment of a fuel conditioning apparatus in accordance with the present invention.

Referring to FIG. 1, a fuel conditioning system 10 comprises a housing 12 defining a chamber 14 and provided with an inlet 16 upstream of the chamber 14 and an outlet 18 downstream of the chamber 14. A hemispherical seat 20 is formed in the housing 10 with a first end 22 in communication with the inlet 16, and a second end 24 in communication with the chamber 14. Second end 24 lies in plane containing a diameter of the seat 20. A valve body 26 is received within the seat 20 and comprises a curved surface 28 and a planar surface 30 which extends across the curved surface 28. The valve body 26 is movable between a closed position where the valve body 26 seals the inlet 16 (and the first end 22) and an open position where the valve body is spaced from the inlet 16 to allow air presented at the inlet 16 to flow through the first end 22 between the seat 20 and curved surface 28, and through a gap 38 between the second end 24 and an adjacent portion of the valve body 26 into the chamber 14. A bias device in the form of a spring 32 biases the valve body 26 toward the closed position. Fuel is injected into the chamber 14 by a fuel delivery system which in this embodiment comprises a fuel injector 34.

The fuel conditioner 10 is ideally suited for coupling to an internal combustion engine (not shown) via an intake manifold 36 connected to the outlet 18. Due to the coupling with intake manifold 36 of an internal combustion engine, a relative negative pressure is induced in the chamber 14. This pressure acts on a valve body 26 to lift it from the seat 20 against the bias of the spring 32.

Fresh air is delivered via a conduit 42 coupled to the inlet 16. The fresh air is drawn from over an exhaust manifold (not shown) associated with an engine to which the fuel conditioner 10 is attached. This heats the air to between about 30° C. to 260° C. after the engine has reached normal operating temperature.

Fuel injected into the chamber 14 is thermally cracked by collision with molecules of the heated air to form a thermally cracked fuel and heated air mixture.

Throughout this specification, the term "thermal cracking" in relation to fuel is used to mean vaporisation, volatilisation, or decomposition of high molecule weight hydrocarbons to lower weight molecule hydrocarbons, or any combination thereof.

The chamber 14 has an internal surface 46 a first portion 48 of which extends in an inclined manner contiguously from the second end 24 toward to the outlet 18. While the surface may be linearly inclined it is believed more preferable for the first portion 48 to be concavely curved when viewed in a direction from the outlet 18 to the inlet 16. More particularly, first portion 48 comprises a portion of a sphere intersected by two parallel planes, one of a diameter greater than that of the hemispherical seat 20, and the other of a diameter identical to that of end 24. Formed contiguously with the first portion 48 is a second portion 50 of the internal surface 46 which is of constant diameter. A third portion 52 of the internal surface 46 extends contiguously from the second portion 50 in a downstream direction toward the outlet 18 and has a progressively decreasing internal diameter. The third portion 52 in this embodiment is configured as a mirror image of the first portion 48. However in alternate embodiments, the third portion 52 may be formed as an extension of the second portion 50 having a constant inner diameter. In a further alternate embodiment, the third portion 52 can be formed with a lineally decreasing inner diameter in the downstream direction.

A shaft 54 is associated with the valve body 26 to guide the valve body 26 when moving between the closed position and the open position. Moreover, the shaft 54 extends into a passage 56 formed in the valve body 26 perpendicular to the planar surface 30 and along a radius of the valve body 26. Opposite ends of the shaft 54 are seated in the conduit 42 and intake manifold 36. The spring 32 is retained on the shaft 54 and acts between the planar surface 30 and a bush 58 held centrally within a plate 60 lying parallel to the planar surface 30.

Ideally the shaft 54 and spring 32 are made of stainless steel with the bush 58 being made of brass.

The plate 60 is spaced from the second end 24 by, and supported on, a plurality of pins 62 that extend parallel to the shaft 54. The plate 60 is dimensioned to provide an annual space 64 between the plate 60 and an adjacent portion of the internal surface 46 of the chamber 14. The plate 60 is of the diameter ranging from about the diameter of the second end 24 to approximately 85% of the maximum internal diameter of the chamber 14. In this embodiment the plate 60 is at substantially the same level as the transition from surface portion 48 to surface portion 50.

A first mesh screen 66 extends across the chamber between the plate 60 and the outlet 18. The mesh 66 is parallel to the second opening 24 and may be made from stainless steel wire with the ratio of wire area to total screen area being from about 1:5 to 1:9 but preferably about 1:7.

A second mesh screen 68 of similar construction to, and parallel with, the first screen 66 extends across the chamber 14 between the first mesh screen 66 and the outlet 18.

Figure 2:
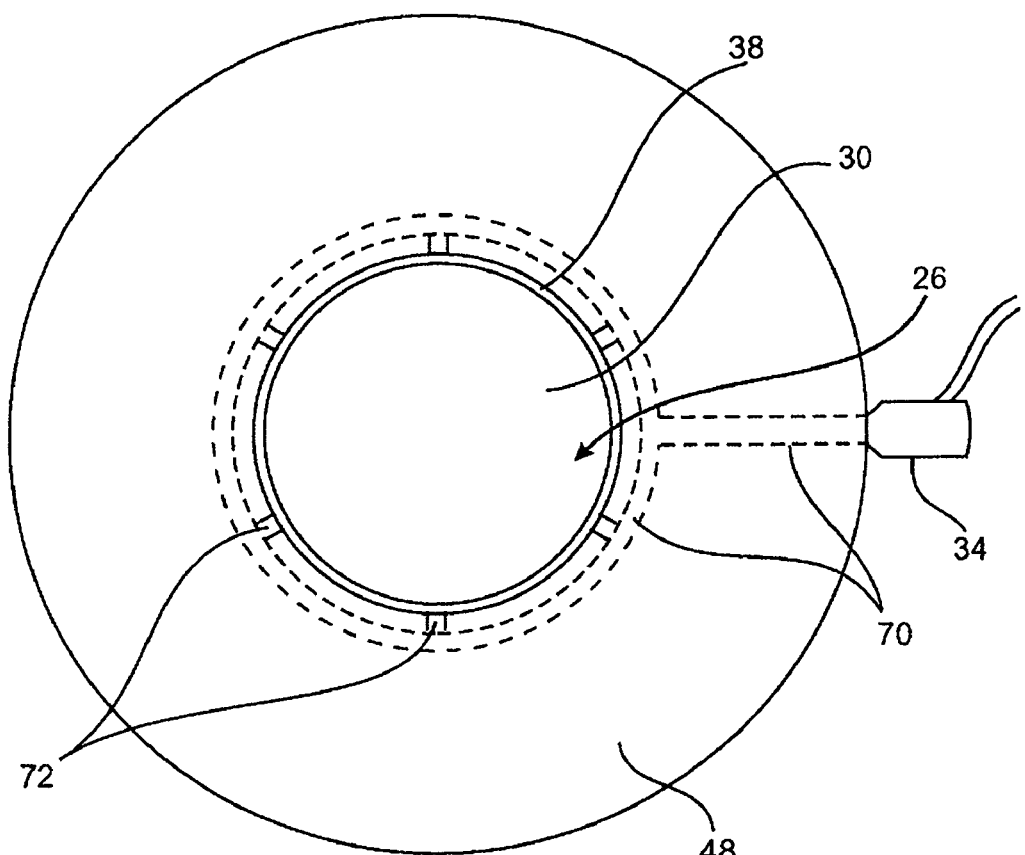
FIG. 2 is a plan view of the fuel conditioning apparatus along line AA shown in FIG. 1; and, FIG. 3 is an enlarged partial view of the fuel conditioning apparatus.

The fuel injection system also comprises a fluid gallery 70 formed internally in the housing 12 which is in fluid communication with the fuel injector 34, and a plurality of openings or jets 72 (see FIG. 2) that spray fuel laterally into the chamber 14. More particularly, the jets 72 spray the fuel across the gap 38 laterally onto the valve body 26 from a location adjacent the transition from the seat 20 to the first surface portion 48.

Figure 3:
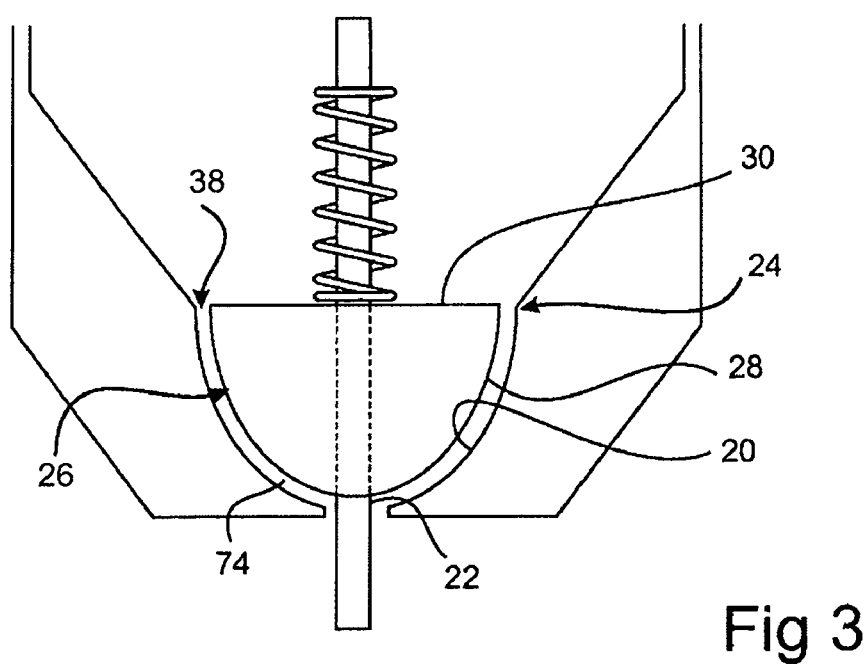

With reference to FIGS. 1 and 3, the valve body 26 is of hemispherical shape and of a complimentary configuration of the seat 20 so that the body 26 can be fully seated in the seat 20 with the surface 28 contacting the seat 20 and the planar surface 30 lying in a plane containing the opening 24.

When the valve body 26 is lifted from the seat 20 by application of vacuum in the chamber 14 a void 74 is formed between the surface 28 and the seat 20. The void 74 is in the shape of a three-dimensional curved shell having a crescent-shaped cross-section. This void leads to the gap 38 created between the second opening 24 and an adjacent portion of the body 26. It should be appreciated that due to the complimentary hemispherical shapes of the seat 20 and the valve body 26, the gap 38 widens relatively slowly as the valve body 26 is lifted.

Moreover, the size of the gap 38 increases at a slower rate than the distance between the body 26 and the seat 20 in the vicinity of the first end 22. When the engine to which the fuel conditioner 10 is coupled is at idle speed, the gap 38 may be in the order of 3 mm to 7 mm, the variation depending on the specific idle speed and engine size. At full throttle, the gap 38 is typically between 14 mm to 18 mm. Due to the shape of the valve body 26 and the seat 20 the gap 38 is in the shape of an annulus.

Air emanating from the annular gap 38 splays outwardly by approximately 15°. This is substantially commensurate with the inclination of the surface portion 48. This in turn minimises the likelihood of air, now carrying fuel vapour, bouncing or deflecting from the surface 48 toward a longitudinal axis of the chamber 14.

The spring 34 provides a pressure of approximately one bar (ie one atmosphere) on the valve body 26. Thus, there is a pressure drop of 1 atmosphere between the inlet 16 and outlet 18 when the valve body 26 is lifted from the valve seat 20 by action of vacuum applied by an engine to which the fuel conditioner 10 is coupled. This pressure reduction assists in vaporisation and thermal cracking of the fuel.

Fuel is injected into the chamber 14 via the injector 34 at a rate so as to produce a substantially stoichmetric fuel to air ratio at the outlet 18, namely fuel to air ratio of 14.78:1.

In one embodiment of the fuel conditioner 10, the inlet 16 and outlet 18 have an internal diameter of 52 mm, the distance (diameter) cross the end 24 is 100 mm and the hemispherical surface portion 48 has a diameter of approximately 150 mm. Distance d1 from the first end 22 to the second end 24 is about 43 mm and the distance d2 between the second end 24 and the transition from surface 48 to surface 50 is in the order of 47 mm. Total length of the housing 12 is in the order of 240 mm, with an outside diameter in the order of 140 mm. The valve body 26 is made of black nylon and has a weight of approximately 120 g. However the above dimensions will vary for different sized (capacity) engines.

Typically, a throttle valve 76 is provided in the intake manifold 36 and can be actuated by a solenoid or other actuator in response to depression of an accelerator pedal and/or other control signals and inputs.

The operation of the fuel conditioner 10 will now be described.

Prior to starting of an engine to which the conditioner 10 is connected, the spring 32 biases the valve body 26 against the opening 16 thus sealing the inlet 14. Upon starting of the engine, a vacuum is created which is communicated through the intake manifold 36 to the chamber 14. The vacuum lifts the body 26 against the bias of the spring 32 allowing air to pass through the opening 16 and gap 38 into the chamber 14. Fuel is injected laterally into the chamber 14 against the valve body 26. The air passing through the gap 38 impacts with and carries the fuel in a downstream direction toward the outlet 18. After a short period of time, the temperature of the air flowing in through the gap 38 becomes heated between 30° C. to 260° C. The impacting of the fuel molecules sprayed into the chamber 14 with the heated air causes thermal cracking of the fuel. The thermal cracking is further enhanced by impacting of fuel drops and molecules against the plate 60, and meshes 66 and 68. The inclination and/or curvature of the surface 48 assists in minimising deflection of the air toward a central longitudinal axis of the chamber 14 which may otherwise cause accumulation of fuel within that region of the chamber 14.

Due to the relative configurations of the seat 20 and the valve body 26 variation in the gap size 38 occurs in a relatively controlled manner, as vacuum increases. This provides greater control over air speed and minimises "bounce" of the valve body 26.

The thermally cracked fuel passes through the inlet 18 into the inlet manifold 26 to the cylinders (not shown) of the internal combustion engine. The fuel, being thermally cracked and substantially in a stochiometric ratio of 14.78:1 is conditioned for efficient burning in the engine.

A controller or engine management unit (not shown) controls the volume of fuel being sprayed in by the injector 34 commensurate with the throttle position 36 and engine vacuum.

All modifications and variations of the above described embodiment that would be obvious to a person of ordinary skill in the art are deemed to be within the scope of the present invention the nature of which is to be determined from the above description and the appended claims.

The invention claimed is:

1. A fuel conditioning apparatus comprising:
    a housing defining a chamber and provided with an inlet upstream of the chamber and an outlet downstream of the chamber;
    a hemispherical seat with a first end in fluid communication with the inlet and a second end in fluid communication with the chamber, the second end lying in a plane containing a diameter of the hemispherical seat;
    a valve body comprising a curved surface and a planar surface extending across the curved surface, the valve body being movable between a closed position where the valve body seals the inlet, and an open position where the valve body is spaced from the inlet to produce a gap between the valve and the seat allowing air at the inlet to flow through the first and second ends into the chamber;
    a bias device that biases the valve body toward the closed position; and,
    a fuel delivery system comprising a fuel injector provided with a plurality of jets that open onto the hemispherical seat and are disposed about the valve body, the jets arranged to spray fuel across the gap and laterally relative to a direction of flow of the air from the inlet into the chamber.

2. The fuel conditioning system according to claim 1 wherein the curved surface is hemispherical in shape having a radius substantially the same as a radius of said seat, whereby when said valve body is in said closed position said planar surface lies in the plane containing the diameter of the seat.

3. The fuel conditioning system according to claim 1 wherein the chamber comprises an internal surface with a first portion that extends outward from the second end toward the outlet.

4. The fuel conditioning system according to claim 3 wherein the first portion of the internal surface is concavely curved when viewed in a direction from the outlet to the inlet.

5. The fuel conditioning system according to claim 4 wherein the air is fresh air.

6. The fuel conditioning apparatus according to claim 1 further comprising a shaft associated with the valve body to guide the valve body when moving between the closed position and opened position.

7. The fuel conditioning system according to claim 6 wherein the shaft extends though a passage formed in the valve body perpendicular to the planar surface and along a radius of the valve body.

8. The fuel conditioning system according to claim 7 wherein the bias device is mounted on the shaft.

9. The fuel conditioning system according to claim 1 wherein the bias device applies a pressure in the order of one bar on the valve body.

10. The fuel conditioning system according to claim 1 further comprising a plate lying parallel to the planar surface and located centrally of a longitudinal axis of the chamber between the second end and the outlet, the plate dimensioned to provide an annular space between the plate and adjacent portion of the internal surface of the chamber.

11. The fuel conditioning system according to claim 10 wherein a first mesh screen extends across the chamber and is located between the plate and the outlet.

12. The fuel conditioning system according to claim 11 wherein a second mesh screen extends across the chamber and is located between the first mesh and the outlet.

13. The fuel conditioning system according to claim 1 wherein the jets are located near the second end.

* * * * *